United States Patent [19]

Leigh-Monstevens

[11] Patent Number: 4,980,668

[45] Date of Patent: Dec. 25, 1990

[54] MOTOR VEHICLE CONTROL SYSTEM

[75] Inventor: Keith V. Leigh-Monstevens, Troy, Mich.

[73] Assignee: Automotive Products (USA), Inc., Sterling Heights, Mich.

[21] Appl. No.: 459,523

[22] Filed: Jan. 2, 1990

Related U.S. Application Data

[63] Continuation-in-part of Ser. No. 323,825, Mar. 15, 1989, which is a continuation-in-part of Ser. No. 95,856, Sep. 14, 1987, Pat. No. 4,841,793, which is a continuation-in-part of Ser. No. 62,775, Jun. 16, 1987, Pat. No. 4,790,204.

[51] Int. Cl.⁵ ............................................. G08B 21/00
[52] U.S. Cl. .................................... 340/456; 340/459; 340/461
[58] Field of Search ......................... 340/456, 459, 461

[56] References Cited

U.S. PATENT DOCUMENTS 4,447,801  8/1984  Masuda ............................... 340/459
4,896,135  1/1990  Deeds et al. ......................... 340/456

FOREIGN PATENT DOCUMENTS

89/03319  4/1989  PCT Int'l Appl. .

Primary Examiner—Glen R. Swann, III
Attorney, Agent, or Firm—Krass & Young

[57] ABSTRACT

A control system for a motor vehicle of the type including an automatic transmission having a plurality of shift positions and an ignition switch. The system includes a push-button module adapted to be positioned in the passenger compartment of the motor vehicle proximate the vehicle operator and including a plurality of push buttons corresponding respectively to the transmission shift position. Electrical logic means are provided to move the transmission to the shift position corresponding to the shift position selected by depression of the specific push button and an enunciator lamp is associated with each push button. The lamp associated with the push button corresponding to the instantaneous position of the transmission is illustrated to provide a continuous indication of the present position of the transmission and all of the lamps associated with the various push-buttons are illuminated for a predetermined period of time following initial movement of the ignition switch to an activated position to provide a system check to ensure that the lamp display system is working properly. The instantaneous position of the transmission is also displayed in symbol form in a window in the instrument panel immediately forwardly of the operator.

17 Claims, 3 Drawing Sheets

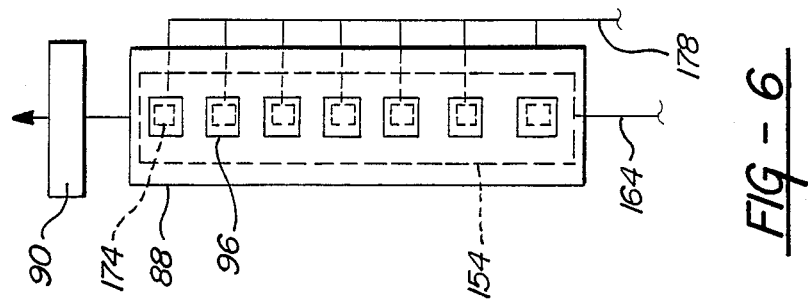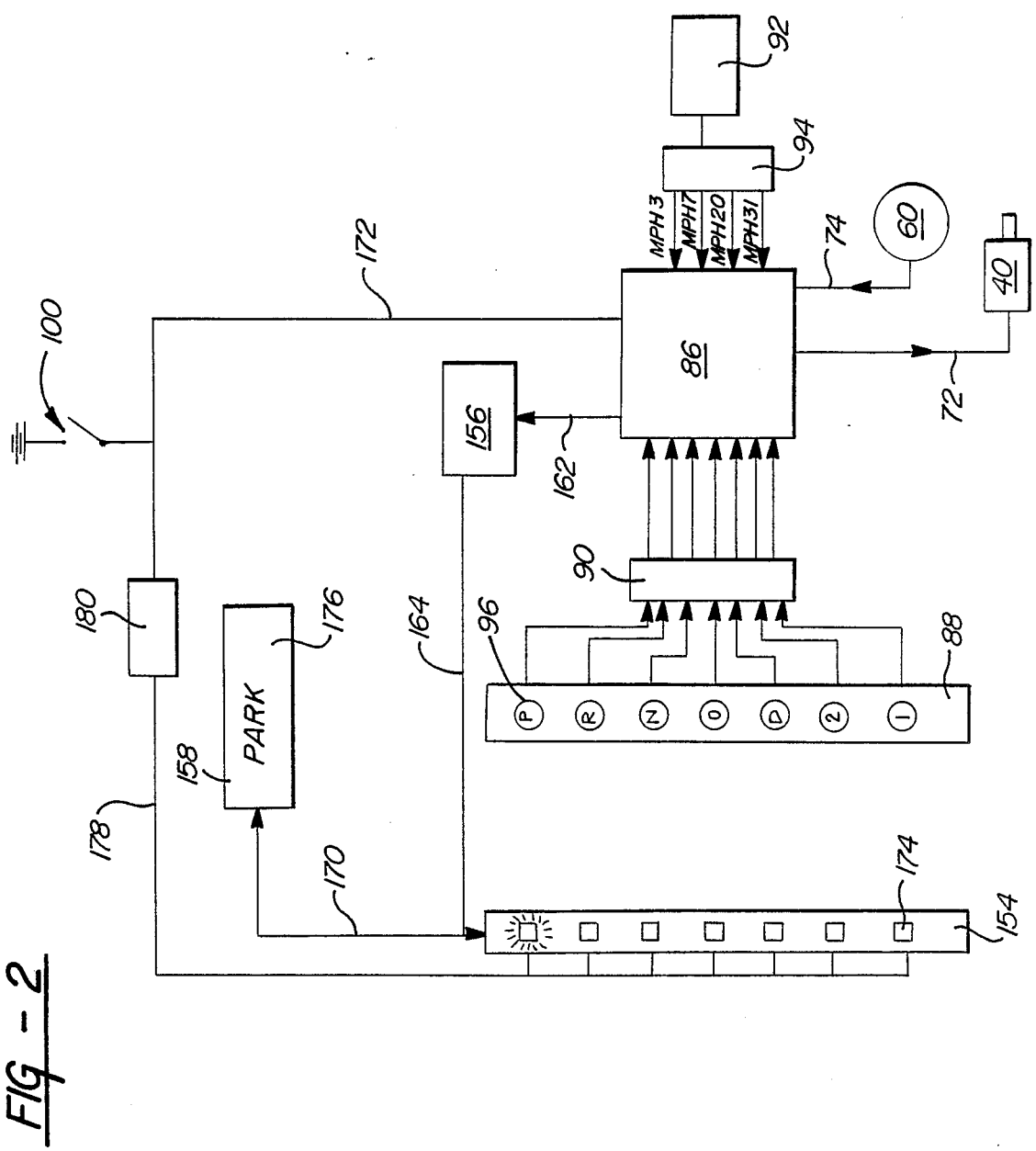

MOTOR VEHICLE CONTROL SYSTEM

REFERENCE TO RELATED APPLICATIONS

This application is a continuation-in-part of U.S. Patent Application Ser. No. 323,825 filed Mar. 15, 1989, which in turn is a continuation-in-part of application Ser. No. 095,856 filed 9/14/87, now U.S. Pat. No. 4,841,793, which in turn is a continuation-in-part of application Ser. No. 062,775 filed 6/16/87, now U.S. Pat. No. 4,790,204.

BACKGROUND OF THE INVENTION

This invention relates to control systems for motor vehicles and more particularly to an electronic control system for a motor vehicle transmission.

Motor vehicles since their inception have required some manner of gear change mechanism to satisfy the varying torque and speed requirements encountered during the typical duty cycle of a motor vehicle. For many years these gear change mechanisms were manual in the sense that they required an operator input from a shift lever or the like to effect each desired gear change ratio. More recently, so-called "automatic" transmissions have become popular in which much of the shifting is done without operator input in response to sensed speed and throttle opening parameters. These automatic transmissions typically include a mode select member on the transmission housing movable between a plurality of selected positions corresponding to a respective plurality of shift modes within the transmission. The mode select member is moved between its several shift positions by a cable or linkage mechanism extending from the mode select member to as suitable gear selector lever located in the passenger compartment of the vehicle. Various proposals have been made in the past to eliminate the mechanical interconnection between the driver operated lever and the mode select member and provide instead an electric shift apparatus in which electrical signals generated by a suitable action on the part of the driver are transmitted electrically to some manner of power means arranged to move the mode select member. Electric shift systems of this general type are shown, for example, in U.S. Pat. Nos. 4,790,204; 4,817,471; 4,841,793 and 4,843,901, all assigned to the assignee of the present application.

It is important in such electric shift systems that some means be provided to continuously display the present shift position of the transmission to the driver and it is further important to ensure that the means for displaying the present transmission shift position are working properly.

SUMMARY OF THE INVENTION

This invention is directed to the provision of a motor vehicle having an improved electric transmission control.

This invention is more specifically directed to the provision of an electric transmission control for a motor vehicle including means to continuously display the present shift position of the transmission and means to readily ensure that the transmission shift position display means are working properly.

The control system of the invention is intended for use with a motor vehicle of the type having a transmission having a plurality of shift positions, a gear selector assembly defining a plurality of select positions corresponding respectively to the transmission shift positions, means operative to generate an electrical signal in response to selection of a gear selector assembly select position, means operative in response to receipt of an electrical signal to shift the transmission to a shift position corresponding to the selector gear assembly position generating the received electrical signal, and an ignition switch.

According to the invention, the control system includes enuciator means associated with each gear selector assembly select position and operative when individually activated to distinguish the associated select position from the other select positions; means operative to activate the enuciator means associated with the gear selector assembly select position corresponding to the instantaneous shift position of the transmission; and means operative in response to movement of the ignition switch to an activated position to activate all of the enuciator means and to thereafter deactivate all of the enuciator means with the exception of the enuciator means associated with the gear selector assembly select position corresponding to the instantaneous shift position of the transmission. This arrangement provides the operator with a clear indication at all times of the instantaneous position of the transmission and further provides a system check each time the ignition switch is initially moved to its activated position.

According to a further feature of the invention, the system further includes indicator means, remote from the gear selector assembly but readily visible to the vehicle operator, operative to provide a visual indication of the instantaneous shift position of the transmission independent of the enuciator means. This arrangement provides a further assurance to the operator with respect to the actual instantaneous position of the transmission.

According to a further feature of the invention, the indicator means comprises a symbol display means which is operative to display a selected one of a series of different visual symbols corresponding respectively to the various shift positions of the transmission, and the symbol display means is operative in response to initial movement of the ignition switch to its activated position to display a visual symbol corresponding to the instantaneous position of the transmission and continues to display that visual symbol until the transmission is shifted to a new position.

In the disclosed embodiments of the invention, the gear selector assembly comprises a push-button module, the enuciator means comprise an individual lamp in association with each push button to indicate the instantaneous shift position, and the symbol display means comprises a window in the instrument panel of the vehicle, directly forwardly of the operator, in which the visual symbols corresponding respectively to the various shift positions are selectively displayed.

BRIEF DESCRIPTION OF THE DRAWINGS

FIG. 2 is a block diagram of the control system of FIG. 1;

FIG. 6 is a fragmentary schematic view of an alternate display arrangement for the invention control system.

DETAILED DESCRIPTION OF THE PREFERRED EMBODIMENT

Figure 1:
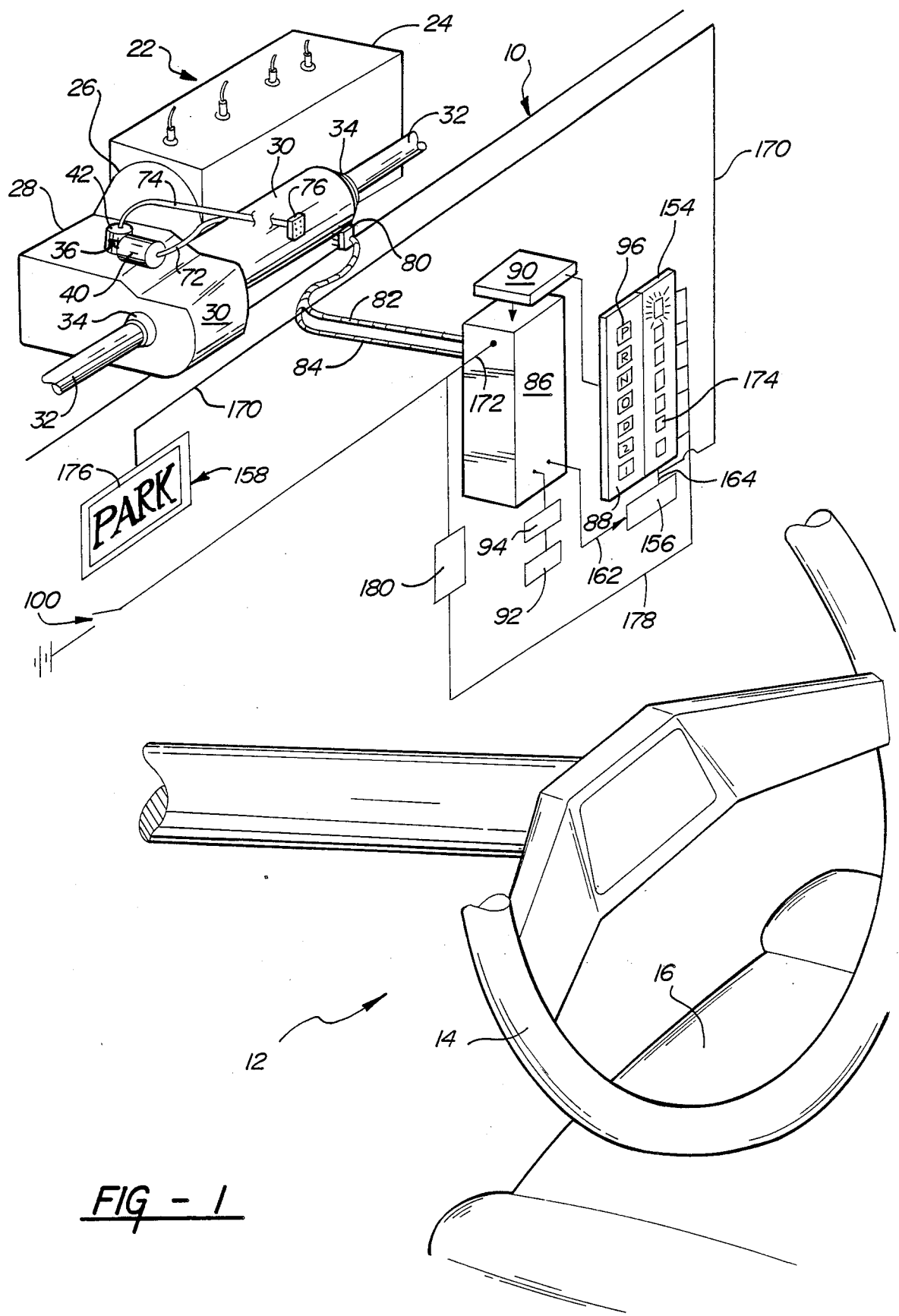
FIG. 1 is a fragmentary perspective schematic view of a motor vehicle employing a control system according to the invention.
Figure 3:
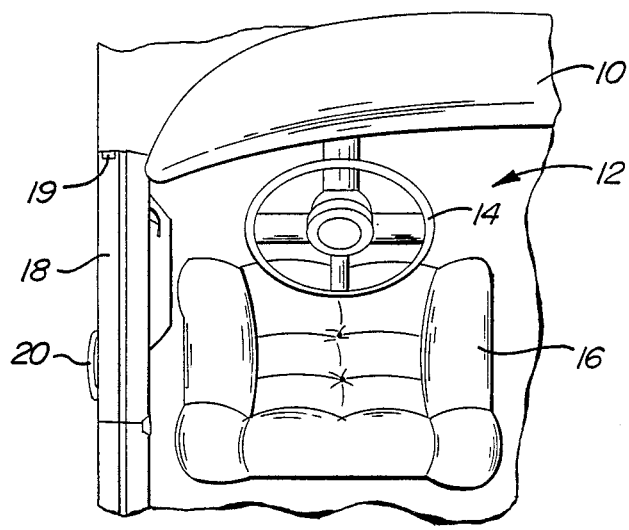
FIG. 3 is a fragmentary plan view of a motor vehicle utilizing the invention control system.

The invention control system is seen schematically in FIGS. 1 and 3 in association with a motor vehicle of the front wheel drive type and including an instrument panel assembly 10 positioned within the passenger compartment 12 of the motor vehicle; a steering wheel 14 associated with the instrument panel; an operator seat 16; a door 18 mounted for pivotal opening and closing movement about a front hinge axis 19 and having a door handle 20 actuating a door latching mechanism (not shown) of known form to allow pivotal opening movement of the door about hinge axis 19 in response to movement of handle 20; and a front wheel drive assembly 22.

Front wheel drive assembly 22 includes an internal combustion engine 24 mounted transversely in the engine compartment of the vehicle, a torque converter 26 driven by engine 24, a gear drive assembly 28, an automatic transmission 30, drive shafts 32 drivingly connected to the opposite ends of transmission 30 by joints 34, and a power module 36.

Figure 4:
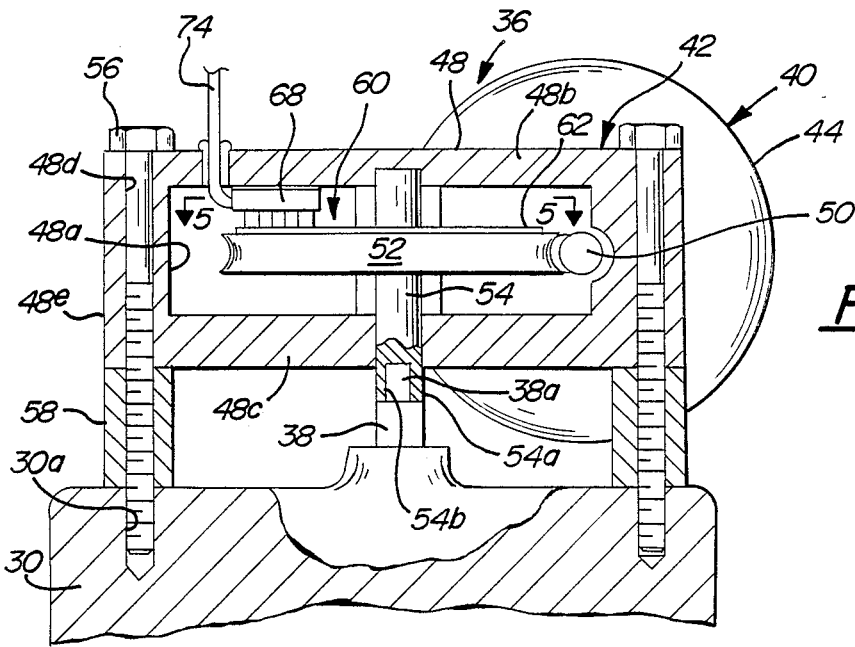
FIG. 4 is a cross-sectional view of a power module utilized in the invention control system.

As seen in FIG. 4, transmission 30 includes a mode select shaft 38 having a free upper end positioned above the housing of the transmission and operable in response to rotation of the shaft to operate internal devices within the transmission to position the transmission in a plurality of transmission shift modes such as park, reverse, neutral, drive, etc.

Power module 36 is adapted to be bolted to transmission housing 30 in proximity to mode select shaft 38 and includes a DC electric motor 40 and a speed reduction unit 42.

Motor 40 is a direct current motor having, for example, an output torque rating of 200-inch pounds and includes a housing 44 and an output shaft 46.

Speed reduction unit 42 includes a housing 48 fixedly secured to motor housing 44 and defining an internal cavity 48a; a worm gear 50 formed as a coaxial extension of the motor output shaft and extending into cavity 48a; a worm wheel 52 positioned in cavity 48a and driven by worm gear 50; and an output shaft 54 driven by including a free lower end 54a positioned outside of and below housing wall 48c. Shaft lower end 54a includes a D-shaped opening 54b for driving coupling receipt of the D-shaped upper end portion 38a of mode select shaft 38.

Power module 36 is mounted on the upper face of transmission housing 30 by a plurality of bolts 56 passing downwardly through bores 48d in lug portions 48e of reduction unit housing 48 and downwardly through spacers 58 for threaded receipt in tapped bores 30a in transmission housing 30. In assembled relation, reduction unit output shaft 54 is coaxially aligned with mode select shaft 38 and D opening 54b in reduction unit shaft lower end 54a telescopically receives D-shaped upper end 38a of mode select lever 38 so that actuation of motor 40 acts through worm shaft 50, worm wheel 52, and reduction unit output shaft 54 to drive transmission mode select shaft 38.

Figure 5:
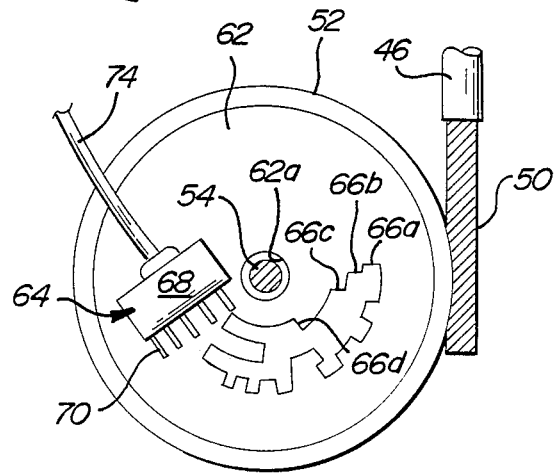
FIG. 5 is a view taken on line 5-5 of FIGURE 4.

Power module 36 further includes an encoder assembly 60, seen in FIGS. 4 and 5, operative to sense the instantaneous shift position of the transmission and generate an encoded signal representative of the sensed shift position.

Encoder assembly 60 includes an encoder wheel 62 and a pickup device 64. Encoder wheel 62 may be formed for example of a suitable plastic material and is secured to the upper side face of worm wheel 52 within reduction unit housing chamber 48a. Encoder wheel 62 includes a central aperture 62a passing reduction unit output shaft 54 and further includes code indicia 66 provided on the exposed face of the wheel and arranged along four arcuate indicia tracks 66a, 66b, 66c and 66d centered on the center line of the encoder wheel.

Pickup device 64 includes a plastic body member 68 mounting a plurality of flexible resilient contact fingers 70 for respective coaction with indicia tracks 66a, 66b, 66c and 66d. In addition to the four, fingers 70 for respective engagement with the four indicia tracks, a fifth finger is provided to provide a ground for the system. A lead 72 from motor 40 and a lead 74 from pickup device 64 are combined into a pin-type plug 76 (FIG. 1).

Plug 76 is adapted for plugging coaction with a plug 80 connected to wires 82 and 84 corresponding respectively to wires 74 and 72, and wires 82 and 84 are connected to a logic control unit which may be mounted for example within the vehicle instrument panel 10. Logic control unit 86 may be constructed for example as a programmable logic array or a gate array or, preferably, may be constructed as a programmed microprocessor circuit. As is explained in more detail in U.S. Pat. No. 4,817,471, assigned to the assignee of the present invention, the logic control unit may function on the basis of Boolean equations which can be embodied in the logic circuits of a programmable microprocessor circuit. Those skilled in the art will understand that it is equally possible to perform the same Boolean operations with a programmable logic array or gate array.

The invention control system also includes a push button module, a desired gear encoder 90, a speed sensor 92, and an analog to digital speed decoder 94.

Push button module includes a plurality of momentary contact push buttons 96 positioned in vertically spaced relation in the front face of the module and corresponding to the available transmission shift modes. Specifically, buttons 96 include buttons corresponding to park, reverse, neutral, overdrive, drive, second and first shift positions for the transmission. The specific output from the push button module, as determined by the specific button depressed by the vehicle operator, is transmitted electrically to desired gear encoder 90 which functions in known manner to generate an electric signal for transmission to logic control unit 86 with the specific transmitted signal corresponding, in coded language, to the specific gear selected by operator depression of the specific push button of the push-button module.

Speed sensor 92 functions in known manner to provide analog information with respect to the instantaneous speed of the vehicle and analog to digital speed decoder 94 receives the analog input from speed sensor 92 and generates a plurality of desired speed signals, for example, MPH3, MPH7, MPH20, and MPH30 for transmission to logic control unit 86. Analog to digital speed decoder 94 produces each speed signal MPH3, MPH7, MPH20 and MPH30 as a digital signal of a first type when the analog information from speed sensor 92 indicates a vehicle speed less than a corresponding predetermined vehicle speed, and as a digital signal of the opposite type when the analog information from speed sensor 92 indicates a vehicle speed greater than the corresponding predetermined vehicle speed. The plurality of speed signals generated by speed decoder 94 provide a plurality of threshold vehicle speed signals for use by the logic control unit in deciding whether a requested shift is allowable in view of the instantaneous speed of the vehicle. The selected threshold vehicle speed signals will of course vary depending upon the particular vehicular application.

In the general operation of the electrical shift control system, a signal from the operator, as originated by depression of the appropriate push button 96 of the push-button module, is relayed to the desired gear encoder 90 and thence to the logic control unit 86 which compares the desired shift signal to the present gear encoder signal as provided from encoder 60 via line 74 and, if the desired signal differs from the present signal and the threshold speed signal MPH3, MPH7, MPH20 and MPH30 being supplied by speed decoder 94 indicates that the desired shift is permissible, transmits a signal through line 72 to motor 40 to rotate the motor in a clockwise or counterclockwise direction and thereby rotate mode select shaft 38 of the transmission to shift the transmission to the desired position. Further details of the manner in which push-button module, power module 36, logic control unit 86, speed sensor 92, speed decoder 94, and desired gear encoder 90 coact to achieve the shifting of the transmission in accordance with the requested signals as provided by operator input to the push-button module are disclosed in U.S. Pat. No. 4,817,471.

The motor vehicle, in accordance with standard practice, includes an ignition switch 100 and logic control unit 86, as more fully explained in U.S. Pat. No. 4,817,471, functions to shift the transmission to park automatically in response to movement of the ignition switch from an on or activated position to an off or deactivated position and so long as the threshold speed signal being supplied at that instant by speed decoder 94 indicates that such a shift is permissible; that is, indicates that the vehicle speed is below three miles per hour.

The invention control system also includes means to continuously display the instantaneous position of the transmission at all appropriate times and in a manner to clearly apprise the operator of the position of the transmission. The transmission display feature of the invention is provided by a present gear indicator 154, a present gear indicator driver module 156, and an instrument panel display 158 preferably of the vacuum fluorescent type.

The present gear indicator driver module 156 is connected to logic control unit 86 via a lead 162 and is in turn connected to present gear indicator module 154 via a lead 164. A lead 170 connects instrument panel VF display 158 to present gear indicator module 154 and a lead 172 connects the ignition switch 100 to logic control unit 86. Lead 172 provides an ignition on signal and, specifically, provides a positive signal at any time that the key is inserted in the ignition switch and the ignition switch moved to an on or activated position.

The present gear indicator module 154 is physically positioned adjacent push-button module 88 and includes a plurality of enunciator lamps 174 corresponding in number to the push buttons 96 of the push-button module with a lamp 174 positioned immediately adjacent each of the push buttons 96 of the push button module. Push-buttons 96 are preferably formed of a translucent material and light means, forming a part of the usual instrument panel lighting circuit, are arranged behind the push-buttons so that the push-buttons are illuminated, at a level depending upon the position of the usual instrument panel light intensity adjustor, upon movement of the ignition to an activated position.

In the alternate arrangement seen in FIG. 6, the lamps 174 are positioned behind the respective corresponding push-buttons 96, the push-buttons are constructed of a translucent material so that the lamps, when energized, cause the corresponding push-buttons to be lighted, and the lamps 174 are arranged in the usual instrument panel lighting circuit. With this alternate arrangement, all of the lamps are illuminated at a relatively low level as a part of the instrument panel lighting, whenever the ignition switch is in an activated position, and the lamp corresponding to the instantaneous position of the transmission is illuminated at a high intensity level to brightly illuminate the push-button corresponding to the present transmission position and provide a clear enunciation of the present transmission position.

During normal vehicle operation, present gear indicator driver module 156 receives an appropriate coded signal from logic control unit 96 via lead 162 representative of the present transmission position, as provided by encoder 160, and transmits an appropriate driver signal via lead 164 to present gear indicator module 154 to light the appropriate lamp 174 corresponding to the instantaneous position of the transmission (or to increase the light intensity of the appropriate push-button in the alternate arrangement of FIG. 6). At the same time, present gear indicator driver module 156 transmits a drive signal via lead 164 and lead 170 to instrument panel display 158 which functions to display in letter symbols the instantaneous position of the transmission in a window 176 provided in the instrument panel of the vehicle directly in the line of sight of the vehicle operator. That is, if the vehicle transmission is presently in PARK, the lamp 174 adjacent the PARK push-button will be lit and the word "PARK" will be displayed in the window 176.

When the operator enters the vehicle and moves the ignition switch 100 to an on or activated position, a signal is transmitted to logic control unit 86 via lead 172 and thence via lead 162 to present gear indicator driver module 156 so as to generate an appropriate drive signal via lead 164 to present gear indicator module 154 to light the appropriate light 174 and generate a drive signal in lead 170 to display the appropriate letter signals in window 176, thereby to indicate the instantaneous position of the transmission. Since, as previously indicated, logic control unit 86 functions in response to movement of the ignition key to the off position to automatically shift the transmission to the PARK position, the transmission will be in the PARK position as the operator returns to the vehicle and accordingly the lamp 174 opposite the PARK push button will be lit and the instrument panel display 158 will display the word "PARK".

Further in response to the operator movement of the ignition switch to an on or activated position, a signal is transmitted by a lead 178 to present gear indicator 154 to light all of the lamps 174, thereby providing a system check that all of the lamps are operational. The lamps 174 continue to be lit for a time determined by a timer 180 in line 178, whereafter, as the timer times out, the signal via lead 178 is terminated but the lamp 174 corresponding to the present gear position, for example PARK, continues to be illuminated via lead 164 and the VF display in window 158, for example PARK, continues in effect via leads 164 and 170. Timer 180 may for example time out one second after the ignition is moved to the on position, thereby providing the operator with a one second system check to ensure that all lamps 174 are operational, whereafter the system automatically reverts to the mode in which the instantaneous position of the transmission is indicated by illumination of the appropriate lamp 174 and the instantaneous position of the transmission continues to be displayed in letter symbol format in window 158.

It will be understood that, in the alternative arrangement of FIG. 6, all of the push-buttons will be brightly illuminated in response to movement of the ignition to an activated position, whereafter, following timing out of the timer 180, only the push-button corresponding to the present position of the transmission will remain brightly illuminated and the other push-button buttons will revert to a low level illumination as determined by the setting of the instrument panel lighting circuit.

The invention transmission display system will be seen to provide a clear and positive display to the vehicle operator at all times of the instantaneous position of the transmission, both by virtue of the particular lamp 174 that is lit in the present gear indicator module 154 and by virtue of the specific legend displayed in the instrument panel display 158, and further functions each time the vehicle is started to provide a system check to assure the operator that the display system is working properly.

Whereas preferred embodiments of the invention has been illustrated and described in detail, it will be apparent that various changes may be made in the disclosed embodiment without departing from the scope or spirit of the invention. For example, although the enunciator lamp system check in the disclosed embodiments involves simultaneous illumination of all of the enunciator lamps, it is equally within the scope of the invention to check the enunciator lamp system by sequential illumination of all of the enunciator lamps in response to movement of the ignition switch to an on position.

I claim:

1. A control system for a motor vehicle of the type having a transmission having a plurality of shift positions, a gear selector assembly defining a plurality of select positions corresponding respectively to the transmission shift positions, means operative to generate an electric signal in response to selection of a gear assembly select position, means operative in response to receipt of an electrical signal to shift the transmission to a shift position corresponding to the selected gear assembly position generating the received electrical signal, and an ignition switch, said control system comprising:
   enunciator means respectively associated with each gear selector assembly select position and operative when individually activated to distinguish the associated select position from the other select positions;
   means operative to activate the enunciator means associated with the gear selector assembly select position corresponding to the instantaneous shift position of the transmission; and
   means operative in response to movement of said ignition switch to an activated position to activate all of said enunciator means and to thereafter deactivate all of said enunciator means with the exception of the enunciator means associated with the gear selector assembly select position corresponding to the instantaneous shift position of the transmission.

2. A control system according to claim 1 wherein:
   said gear selector assembly comprises a plurality of push buttons with each push button corresponding to a respective transmission shift position.

3. A control system according to claim 2 wherein:
   said enunciator means comprise light means associated with each push button.

4. A control system according to claim 3 wherein:
   said light means comprises an individual lamp proximate each push button.

5. A control system according to claim 3 wherein:
   said light means comprise means selectively illuminating each push button.

6. A control system according to claim 1 wherein:
   said system further includes indicator means, remote from said gear selector assembly but readily visible to the vehicle operator, operative to provide a visual indication of the instantaneous shift position of the transmission independent of said enunciator means.

7. A control system according to claim 6 wherein:
   said indicator means comprises a symbol display means which is operative to display a selected one of a series of different visual symbols corresponding respectively to the various shift positions of the transmission.

8. A control system according to claim 7 wherein:
   said indicator means includes a window in the instrument panel of the vehicle, directly forwardly of the operator, in which said visual symbols are selectively displayed.

9. A control system according to claim 7 wherein:
   said symbol display means is operative in response to initial movement of said ignition switch to an activated position to display a visual symbol corresponding to the instantaneous position of the transmission and continues to display that visual symbol until the transmission is shifted to a new position.

10. A control system for a motor vehicle of the type including an automatic transmission having a plurality of shift positions and an ignition switch, said system including:
    a push button module adapted to be positioned in the passenger compartment of the motor vehicle proximate the vehicle operator and including a plurality of push buttons corresponding respectively to the transmission shift positions;
    electrical means operative in response to operator selection of a specific push button to move the transmission to the shift position corresponding to the selected push button;
    light means associated with each push button;
    means operative with the ignition switch in an activated position to activate the light means associated with the push button corresponding to the instantaneous shift position of the transmission to an extent to provide an enunciation of the associated push button relative to the other push buttons; and
    means operative in response to initial movement of the ignition switch to an activated position to activate all of said light means to an enunciating level.

11. A control system according to claim 10 wherein:
    said system further includes a timer operative to terminate the enunciating activation of all of said light means, with the exception of the light means associated with the push button corresponding to the instantaneous transmission shift position, a predetermined length of time following movement of the ignition switch to the activated position.

12. A control system according to claim 11 wherein: said light means comprise means selectively illuminating each push button.

13. A control system according to claim 11 wherein: said light means comprise an individual enunciator lamp proximate each push button.

14. A control system according to claim 10 wherein: said system further includes indicator means, remote from said push button module, operative to provide a visual indication of the instantaneous shift position of the transmission independent of said light means.

15. The control system according to claim 14 wherein: said indicator means comprise a symbol display means which is operative to display a selected one of a series of different visual symbols corresponding respectively to the various shift positions of the transmission.

16. A control system according to claim 15 wherein: said indicator means includes a window in the instrument panel of the motor vehicle directly forwardly of the operator in which said visual symbols are selectively displayed.

17. A control system according to claim 15 wherein: said symbol display means is operative in response to initial movement of the ignition switch to the activated position to display a visual signal corresponding to the instantaneous position of the transmission and continues to display that visual symbol until the transmission is shifted to a new position.

* * * * *

UNITED STATES PATENT AND TRADEMARK OFFICE
CERTIFICATE OF CORRECTION

PATENT NO.  : 4,980,668

DATED       : December 25, 1990

INVENTOR(S) : Keith Leigh-Monstevens

It is certified that error appears in the above-identified patent and that said Letters Patent is hereby corrected as shown below:

TITLE PAGE

Abstract Line 14, Please delete "illustrated" and insert --illuminated--.

Column 3, Line 48, Please insert --worm wheel 52, journaled in housing walls 48b and 48c and-- after "by" and before "including.

Column 6, Line 44, Please delete "Via" and insert --via--.

Signed and Sealed this

Thirtieth Day of June, 1992

Attest:

DOUGLAS B. COMER

*Attesting Officer*          Acting Commissioner of Patents and Trademarks